Patented Dec. 11, 1945

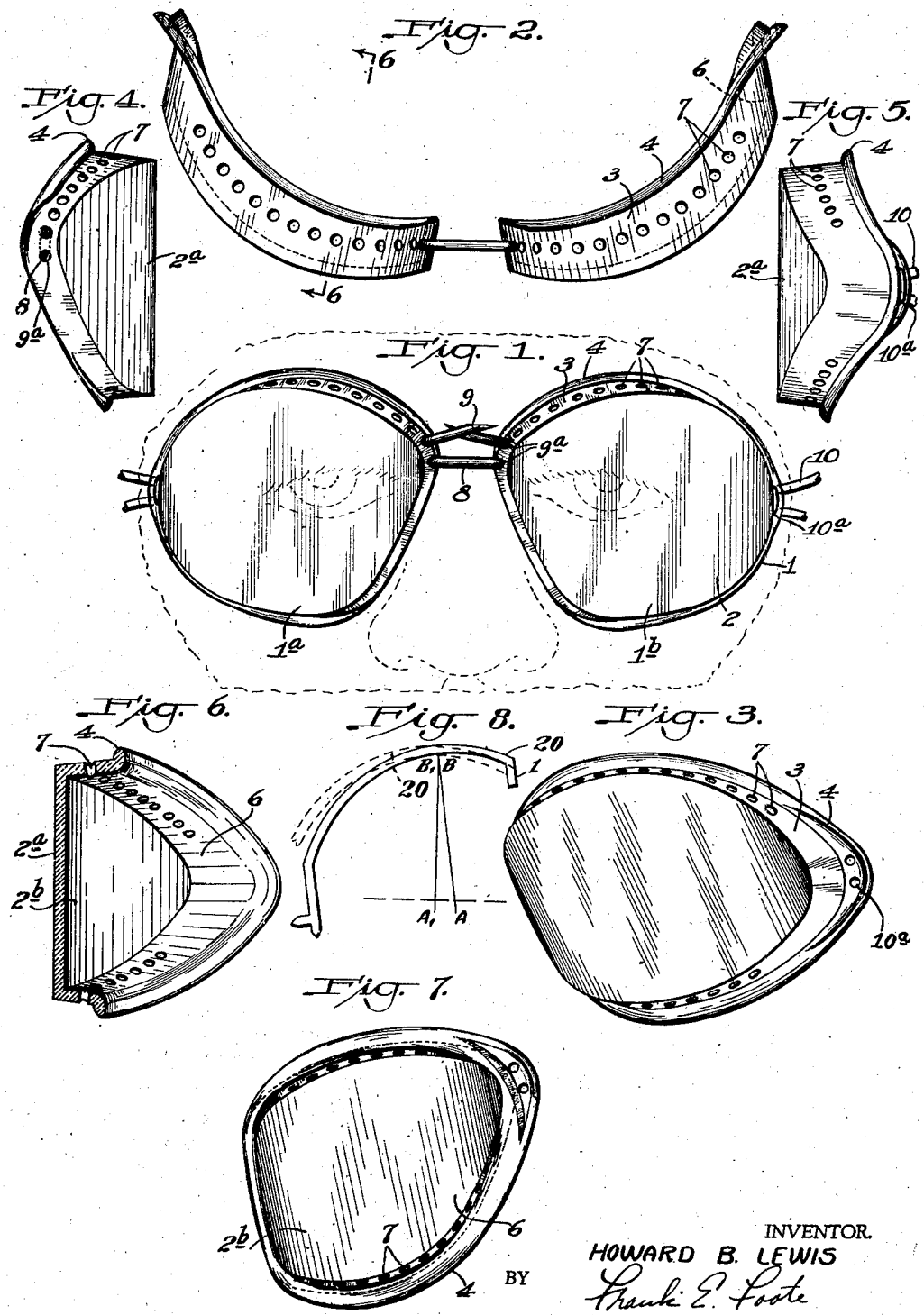

2,390,599

UNITED STATES PATENT OFFICE 2,390,599

EYE PROTECTOR

Howard B. Lewis, Venice, Calif., assignor to B. F. McDonald Company, Los Angeles, Calif.

Application March 14, 1942, Serial No. 434,683

2 Claims. (Cl. 2—14)

This invention relates to an eye protector suitable for use by chippers, grinders, miners, welders and in other occupations where hazards exist of a nature requiring some form of an enclosure about the eyes. This enclosure, in order to operate as a protector, must confront the eye with a material that is vision clear and has sufficient strength to withstand the impact of objects that may be encountered. Since the natures of these occupations are hazardous in many respects, it is necessary that the protector provide as wide vision as possible. The ultimate in wide vision includes full or unobstructed binocular vision and complete monocular vision as well as an ample scope of vision in a vertical direction.

A factor contributing most to limiting the field of vision is the lens support provided for positioning and supporting the lens against the face and attempts have been made to enlarge the range of vision for this type of construction by using some form of curved lens that extends about the face. The somewhat rigid support extending outwardly to provide adequate spacing from the face for supporting the curved lens usually carries some form of bulky spongy or rubber material comfortable in engaging the face to lessen the discomfort caused by pressure in holding the protectors in position. Such a construction obstructs materially the field of binocular vision especially at close range, which is the field of vision that is used most in industrial applications. The construction also limits considerably the extent of monocular vision.

In improving the vision of a protector, cognizance must be taken of the fact that the device must fit about the face yet be supported in some comfortable manner from the head since comfort in wearing is of considerable importance. Ordinary usage of the protector is continuous for periods of several hours and even small discomfort should be avoided in initial wearing since this condition becomes exaggerated and unbearable after a period of continuous use and workers are known to have preferred the hazard rather than endure the discomfort. Therefore, the face engaging surface of the frame or lens support which directly engages the face and applies the support pressure to the face must be properly fitted to the subject if the sponge or rubber cushion is to be eliminated and more vision obtained. As individual constructions are not contemplated and are not practical for industrial applications, a universal shape must be provided which conforms to the contour of the right and left eye sockets and which does not form pressure points about the face and distributes the pressure equally about the engaging surface. Also, the weight of the structure contributes considerably in causing discomfort because most of the weight is supported by pressure against the face while the balance is supported directly by the nose. For any design of protector, weight should be kept at a minimum and any substantial reduction over previous structures would be of considerable advantage.

Another factor to be considered is the reduction or elimination of fogging of the lenses which is accomplished by supplying proper ventilation of the lens by suitable vents of minute holes or baffled slots formed in the structure to produce a draft across the inner surface of the lens with sufficient velocity to carry any highly humidified atmosphere out of the protector chamber into the outside atmosphere. This means of fog elimination is limited in its capacity and material selected for the protector must be of a nature that fogging is not accentuated but, if possible, reduced.

Since eye protectors are used quite extensively in industry and even greater use is encouraged, it is important that any improvements made in protectors be of such nature that the assembly can be supplied inexpensively and, if necessary, be repaired without much inconvenience and at small expense. Many other qualities must be incorporated, some of which are set forth specifically in the objects of the invention. From good authority, it is estimated conservatively that 10% of all industrial accidents in this country concern the eye, the estimated industrial accidents in this country exceeding three million yearly. This condition exists in spite of the protectors available and in use and illustrates the urgent need for an improved protector which has all the advantages necessary so that workers will choose to wear protection rather than, as has been the case heretofore, have to be compelled or persuaded.

It is a principal object of this invention to provide an eye protector providing substantially wide vision, which is comfortable to the wearer, light in weight, strong, capable of withstanding hard usage, of non-corrosive material which does not discolor the skin and withstands sterilization, inexpensive to manufacture, universally adaptable and has structural characteristics to accommodate vents for substantially eliminating fogging of the lens.

By using a lens having a curvature that resembles somewhat the contour of the face, certain optical errors are introduced due to the cylindrical effect of the surfaces as well as the existence of prismatic error due to the thickness of the lens and unless the lens is properly disposed in relation to the eye, these errors are such that they produce eye fatigue and irritation and make the protector impractical. The optimum in disposition of a curved lens for reducing or substantially eliminating the errors is to position the line of straight-ahead vision normal to the surface of the lens at the point of intercept. The use of a separate support has limited the extent of disposition of the lens about the eye and although certain improved relationships have been made, it still is not possible to use a separate support and attain the most desirable lens position since such a position requires that the lens extend too closely to the face to permit the use of a support for mounting the lens.

Another equally important object of this invention is to provide an eye protector having a curved lens of suitable protective thickness and of such construction that the lens is properly supported from the face and disposed in a desirable optical relation with respect to the eye so that substantially full binocular vision is obtainable while the extent of monocular vision is greatly increased.

It has always been thought that to comfortably seal the protector to the face, some form of rubber pad or strip mounted to the inner periphery of the support and having a flat or compressible surface to engage the face and act additionally as a cushioning means against the pressure exerted in maintaining the protector in proper position was required. As explained above, this form of a construction or support along with the supporting frame or lens support obstructs the scope of vision materially. It has been found that a more or less rigid support of lightweight material having a rigid face engaging surface of a shape generally conforming to the curvature of the face about the eye and so arranged or designed that it is universally adaptable need not be uncomfortably pressed against the face to be sealed to the face and does not cause any material discomfort after long periods of use. Another object of this invention, therefore, is to provide a lightweight integral protector construction having a lens and a frame or support construction of suitable material and so designed that its face engaging surface conforms generally to the face about the eye, which can be mounted in sealed relation to the face by applying very little pressure and which is not dependent on certain individual characteristics for comfortable sealing.

Another object of this invention is to provide a lightweight, wide vision eye protector having a lens and frame or support of moldable material, the support having a surface that conforms to the face and being designed so that the lens is positioned in a desirable optical relation with respect to the eye and does not obstruct or interfere with the full vision obtainable by virtue of the nature of the contour of the lens provided.

Another object of this invention is to provide an eye protector of an integrally molded lens and support of transparent material in which the support actually forms a continuation of the lens and terminates in a shape comparable to the contour of the face with the lens disposed in relation to the eye to give certain desirable optical properties as well as provide substantially full vision.

Another object of this invention is to provide an eye protector of transparent moldable material having a lens and a support integral therewith which can be molded by means of the injection process in molding, which is comfortable in wearing, which has a rigid face engaging surface at its inner extent readily sealed to the face of the wearer with the application of little pressure, which can be made inexpensively, which can be arranged to receive an inexpensive and adjustable means for forming a pair of protectors to provide a complete unit and which has sufficient spacing between the lens and face engaging surface to accommodate means for ventilating the lens to prevent fogging.

It is proposed by this invention to mold a complete eye protector that includes a lens of ample thickness to give adequate protection from which a portion extends inwardly to form a surface that is to engage the face and space and seal the lens from the face and which can be so arranged that a lens having a certain curvature can be positioned with respect to the eye to provide the best available optical properties. It was thought, since such an article is to include a portion that is suitable for vision purposes, that the process of manufacture of molded transparent material could not be practiced in molding it without producing certain striae or blemishes in the lens and without forming weld lines in the lens surface. Such a lens would be highly unsatisfactory since it would not have sufficient strength to withstand the "drop ball" test, nor would it be capable of transmitting not less than 89% of incident visible light, which conditions are required of a satisfactory lens. By this invention a complete eye protector is molded and for certain curvatures the lens may be actually disposed in such close relation to the nose that the lens itself almost actually forms a part of the support or a surface that engages the face. This condition represents an extreme condition of design of support but is one that does give desirable results for certain curvatures of the inside and outside surfaces defining the lens and illustrates the extent of application and accommodation of the invention.

An important feature of this invention is that it makes possible an eye protector made up of an integral protective lens and support of moldable material, the lens having a curvature which approaches the flat surface but resembles somewhat the contour of the face. The inside and outside surfaces of the lens have a certain relation to provide desirable optical properties when properly disposed. The lens and support are so formed that the optical center of the lens is coincident with the line of straight-ahead vision when disposed on a wearer. Furthermore, the protector does not require an inconvenient or uncomfortable construction of support to provide the desired disposition of lens, it does not interfere with the extent of vision obtainable from the lens and it provides further improvement in being light in weight, cheap, strong and has other characteristics important in protector structure.

In the drawing:

Fig. 1 is a front elevational view of the preferred embodiment in wearing position which illustrates the attachment of an adjustable bridge to each of a pair of protectors and a headband connected to the temporal sides of each of the protectors;

Fig. 2 is a top plan view of the same embodiment;

Fig. 3 is a front elevational view of the embodiment viewed from a position closer to the temporal side;

Figs. 4 and 5 are nasal side and temporal side views respectively;

Fig. 6 is a sectional view taken along the line 6—6 of Fig. 2;

Fig. 7 is a rear elevational view thereof; and

Fig. 8 is a diagrammatic view of a protector embodying the invention illustrating modifications readily made by use of the invention in altering the optical center of the lens without change in the face engaging surface.

It is proposed by this invention to provide a unitary protector having a lens extending across the eye to permit full binocular vision and a substantial increase in monocular vision, to which is joined a frame for supporting the lens on the face which actually is an integral part of the lens, which forms an inward projection from the peripheral edge of the lens terminating in a surface that is to fit the face about the eye and which is shaped to generally conform to the contour of the face.

Proceeding now to a detailed description of my invention, a preferred embodiment is shown in Figs. 1 to 7 of the drawing in which the numeral 1 indicates a protector made up of a lens 2 and a frame 3 which may be referred to as the inwardly extending peripheral wall of the lens and which has sufficient depth from the face engaging surface 4 of the wall to conveniently accommodate the eye within the chamber 6 defined by the protector and to provide optical disposition of the lens with respect to the eye. The face engaging surface 4 is shaped to fit the contour of the face about the eye and to conform to the face generally. It is preferred that this surface be rounded or beaded. It has been found that, by shaping the protector to conform generally to the face, the protector is held in place by virtue of its own fit to the face and the light weight of the complete protector. This has the advantage that little pressure need be applied to hold the protector in place with the result that, even though the protector is used for several hours, no uncomfortable feeling or any pain about the eye or forehead occurs. It is preferred that the temporal side of the lens 2 converges into the frame or wall with the least angular disposition possible. While it would be preferred to arrange the curvature of the lens so that it would continue to the temporal edge of the protector, such a lens curvature is not practical since it does not have satisfactory optical properties in view of the large cylindrical error present.

For some purposes, it may be necessary and it is believed to be advisable to provide ventilating openings 7 in the frame 3. This may be accomplished either when the frame is molded or after the article has been molded by merely drilling a series of openings in the upper and lower portions of the frame. These openings serve to aid in the ventilation of the inner surface of the lens 2 and prevent fogging.

In order to mount the protector when combined with a similar protector for the purpose of making a pair, a pair of openings 9a are formed in the nasal side of the frame through which a resilient cord or strap 9 is threaded, held and arranged, in the manner illustrated, to form what is an adjustable bridge or attachment of a pair of protectors. Adjustment can be made by merely adjusting the bridge portion 8 of the cord or strap to give greater or lesser expanse as is required. Likewise, a pair of openings 10a is formed in the extreme temporal edge of the protector in order to accommodate a head strap 10 that is threaded through these openings and held in place. These openings 9a and 10a can either be formed during molding or after the article has been molded.

The type of rigid headband illustrated is of value in that it provides an inexpensive structure which can be conveniently adjusted without much effort and which is adequate for the purpose of holding a pair of protectors together in place on the head. Adjustment is accomplished by merely sliding the material in the opening and the material is held in place when positioned because of frictional engagement. The engagement is accentuated by the reverse direction of the material in being threaded through the openings.

Any lens used in a protector must have sufficient thickness to withstand the impacts of the objects which may be encountered in industrial use. This thickness usually is about 3 mm. and, as is apparent, is a source of prismatic error and of fatigue and irritation as well as inconvenience if not properly disposed in relation to the eye. A means of correction for this error is to provide the lens with a concave surface so that all lines of vision are normal to its entrant surface. However, to provide such a curvature increases cylinder error for a lens of uniform thickness. It is the practice for prescription purposes to use certain inside and outside curvatures and arrange them in relation to each other to provide a lens of non-uniform thickness to reduce prism without increasing cylinder error. Therefore, since in this invention it is desired to provide a lens which is a protector and which has substantially desirable optical properties, it is necessary that the radius of curvature for outside surface 2a and the inside surface 2b have a certain relation and disposition with respect to the eye. It is desirable if the optical center of the lens, assuming the lens is not concentric, can be positioned, when the lens is placed in position, coincident with or substantially in alignment with the line of straight-ahead vision. With such an arrangement, the optical center of the lens intercepts the lens surface at right angles or is normal thereto and reduces the prism at this point to zero. This arrangement has not been obtainable heretofore because of the limits of disposition of the lens with respect to the eye due to the construction of protectors which necessarily included a separable lens support interposed between the lens and the face.

Referring specifically to Fig. 8 which is a diagrammatic illustration representing the effects of different dispositions of the lens, it is to be observed that, to change the optical center of the lens 20 of the protector 1, represented by the line designated as AB, to a position where the optical center is on the line A'B' coincident with the line of straight ahead vision, the nasal edge of the lens is moved towards the face engaging surface to such an extent that little space is available for a support. The lens 20 is represented in dotted lines showing the reduction in the nasal wall, while the temporal wall is not fully illustrated since it is obvious that the lens can be readily blended into the wall shown for portion AB or that the lens can be disposed outside the wall as shown and terminate likewise in a surface that will engage the face. The purpose of this illustration is to show the adaptability of the integral lens and frame and to illustrate an advantage in optical disposition. In the event that a separable eye cup or frame is used, it is practically impossible to provide a support about the nasal edge when the optical center is coincident with the line of straight-ahead vision for a lens of about 58 mm. This particular radius is used to considerable extent because of the small curvature and low cylinder error and its accommodation to the face, but difficulty is encountered in disposing the lens so as to minimize prism error. The best attained prior to the invention is represented diagrammatically by the line AB, while with my invention, prism is eliminated at the line of straight-ahead vision and is relatively low in the region of binocular vision. Also, due to the frame or support actually forming a continuation of the lens due to its transparent nature, much greater monocular vision is attained. The lens can be positioned, illustrating adaptability, so that its edge actually forms a part of the face engaging surface. This would be an extreme condition of design, but for some lens such may be necessary in order to provide a proper disposition of the lens with respect to the eye.

Other modifications can be made of this invention such as in the shape of the frame that projects from the lens or in the shape of the lens and the surface of the frame that engages the face. However, the embodiment illustrated represents a preferred embodiment and provides advantages which are not obtainable in any construction of protector heretofore made. According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A one-piece eye protector of a molded transparent plastic and having a horizontally curved lens to the edge of which a rearwardly projecting frame is integrally connected for spacing the lens from the eye, the rear edge of the frame being curved to fit snugly against the face around the eye, the temporal portion of the frame forming a transparent continuation of the lens with which it forms a small external angle, and said frame being formed to receive means for supporting the protector in eye-protecting position.

2. A one-piece eye protector of a molded transparent plastic and having a horizontally curved lens to the edge of which a rearwardly projecting frame is integrally connected for spacing the lens from the eye, the rear edge of the frame being curved to fit snugly against the face around the eye, the temporal portion of the frame forming a transparent continuation of the lens with which it forms a small external angle, and said rear edge of the frame being surrounded by an integral lip provided at its temporal portion with an opening for receiving means for attaching the protector to the head.

HOWARD B. LEWIS.